US008605827B2

(12) United States Patent
Valadon et al.

(10) Patent No.: US 8,605,827 B2
(45) Date of Patent: Dec. 10, 2013

(54) TIMING ERRORS

(75) Inventors: Cyril Valadon, Letchworth (GB); Martin Leach, Cambridge (GB)

(73) Assignee: MStar Semiconductor, Inc., Grand Cayman (KY)

( * ) Notice: Subject to any disclaimer, the term of this patent is extended or adjusted under 35 U.S.C. 154(b) by 664 days.

(21) Appl. No.: 12/300,708

(22) PCT Filed: May 10, 2007

(86) PCT No.: PCT/GB2007/001722
§ 371 (c)(1),
(2), (4) Date: Nov. 13, 2008

(87) PCT Pub. No.: WO2007/132192
PCT Pub. Date: Nov. 22, 2007

(65) Prior Publication Data
US 2009/0232263 A1    Sep. 17, 2009

(30) Foreign Application Priority Data
May 15, 2006    (GB) .................................. 0609601.0

(51) Int. Cl.
*H03D 3/22* (2006.01)
(52) U.S. Cl.
USPC ............................ 375/329; 375/344; 375/346
(58) Field of Classification Search
USPC ................... 375/344–350, 353–355
See application file for complete search history.

(56) References Cited

U.S. PATENT DOCUMENTS

| 4,794,341 | A | * | 12/1988 | Barton et al. | 375/344 |
| 5,809,086 | A | | 9/1998 | Ariyavisitakul | |
| 5,960,044 | A | * | 9/1999 | Montreuil | 375/322 |
| 6,639,939 | B1 | * | 10/2003 | Naden et al. | 375/140 |
| 6,741,643 | B1 | * | 5/2004 | McGibney | 375/229 |
| 7,075,972 | B2 | * | 7/2006 | Horng et al. | 375/346 |
| 7,184,498 | B2 | * | 2/2007 | Moy et al. | 375/346 |
| 2005/0063298 | A1 | * | 3/2005 | Ling et al. | 370/208 |
| 2007/0160165 | A1 | * | 7/2007 | Morgan | 375/299 |

FOREIGN PATENT DOCUMENTS

| EP | 0861549 B1 | 9/1998 |
| WO | 2006/016140 A1 | 2/2006 |
| WO | WO 2006016140 A1 * | 2/2006 |

OTHER PUBLICATIONS

Proakis, John G., "Digital Communications," 1995, McGraw-Hill, XP002445843, pp. 540-565.
PCT International Search Report for International Application No. PCT/GB2007/001722 dated Aug. 8, 2007.

* cited by examiner

*Primary Examiner* — Sam K Ahn
*Assistant Examiner* — Janice Tieu
(74) *Attorney, Agent, or Firm* — Edell, Shapiro & Finnan, LLC

(57) ABSTRACT

A method of analyzing a sampled signal that is supplied for decimation, wherein the decimation process produces a decimated version of the signal and wherein the method comprises determining an adjustment, if any is required, to the sampling instant of the signal prior to decimation that will cause the frequency responses of the decimated signal and of a main alias to combine constructively at a given frequency.

5 Claims, 5 Drawing Sheets

TIMING ERRORS

BACKGROUND

In a typical radio system (see FIG. 1), information is modulated onto a radio carrier by a transmitter. This signal then travels via an unknown and changing environment to the receiver. The ability to remove the effects of the environment from the signal is often key to the performance of a receiver.

The transmitter 101 passes information bits through a block adding error protection coding 102 and then through a modulation block 103 which modulates the coded information onto a radio carrier. As part of the modulation, known symbols may be added to assist with radio channel estimation in the receiver.

Once transmitted, the radio signal then passes through the radio channel 104 before reception 108. This radio channel frequently gives rise to intersymbol interference (ISI) which must then be removed by the receiver to ensure correct reception. Before being processed by the receiver blocks, the signal also acquires both interference and noise. The interference arises from other users of the spectrum whilst the noise is thermal noise from the environment. Additional noise is then added as the signal passes through the Rx front end 105.

The receiver 108 converts the analogue radio signal to a digital base band signal in the Rx front-end 105. The signal is then passed through the demodulation block 106. This serves to estimate the transmitted coded-bits in the presence of the ISI, interference and noise added by the radio channel and the Rx front end. The signal is then decoded 107 to yield the final received information bits.

In a typical receiver, accurate timing recovery is important for the performance of the demodulation unit (106) to be good. The impact on the link level performance of inaccuracies in the timing recovery loop depends on both the propagation environment and the architecture of the demodulation unit. The level of the performance degradation in case of non-ideal timing in the receiver is also heavily influenced by the sampling rate at which the receiver operates. It is well known that receivers operating at a rate higher than symbol rate, also referred to as over-sampled architectures, are less sensitive to timing errors than symbol-rate receivers (*Digital Communications*, John G. Proakis, $2^{nd}$ edition, McGraw-Hill International). However, using over-sampling in the receiver almost invariably leads to a more complex solution both in terms of computations to be performed and memory requirements. Hence, in order to achieve an efficient implementation of the receiver it is desirable to avoid over-sampling the received signal.

High-Speed Downlink Packet Access (HSDPA) is an evolution of the Release 99 version of the 3GPP standard aimed at providing improved user experience through increased data rates and reduced end-to-end latency. These improvements are delivered through a combination of Incremental Redundancy (IR) and the use of higher-order modulation schemes. HSDPA extends the capabilities of 3GPP by introducing the use of the 16QAM modulation for the data bearing channels. It should however be noted that the 16QAM modulation is significantly more sensitive to impairments in the propagation medium, such as ISI, than the QPSK modulation used for the Release 99 version of the 3GPP system. In order to reduce the sensitivity of the receiver to channel impairments, more efficient, and more complicated, receiver architectures have been proposed. The Linear Minimum Mean Square Error (LMMSE) equaliser is an example of such an architecture (*Chip-Level Channel Equalization in WCDMA Downlink*, K. Hooli, M. Juntti, M. J. Heikkila, P. Komulainen, M. Latva-aho, J. Lilleberg, *EURASIP Journal on Applied Signal Processing*, August 2002). The LMMSE equaliser improves the performance of the demodulation unit by mitigating the distortions introduced by the propagation channel. The LMMSE equaliser can be implemented using a pre-filter Rake architecture (*Equalization in WCDMA terminals*, Kari Hooli, PhD thesis, 2003) where the conventional Rake receiver is preceded by a linear filter which aims at removing the ISI introduced by the channel. The link level performance of this receiver depends on the timing of the digital signal being processed. The performance also varies with the rate at which the received digital signal is sampled.

FIG. 2 presents the throughput performance of the pre-filter Rake receiver in fading propagation conditions for both cases of a symbol-rate implementation (one sample per chip) and of an over-sampled implementation (2 samples per chip). The throughput performance is presented versus the timing delay seen by the receiver. It can be seen that in the case of the symbol-rate receiver, the performance significantly varies with the timing used at the receiver. The difference in throughput between the best sampling point and the worst sampling point is approximately equal to 10%. This has to be contrasted against the performance of the over-sampled receiver where the throughput is essentially flat against the timing delay. Hence, using an over-sampled implementation of the receiver reduces/eliminates the need for accurate selection of the sampling point. However, the receiver operating at 2 samples per chip is computationally more complex than the symbol-rate receiver. The associated power consumption for the receiver will therefore be higher. The amount of memory required by the receiver is also larger. It is then important to note that the best throughput achieved by the symbol-rate receiver is in fact not worse than the best throughput achieved by the over-sampled receiver. This observation may seem surprising at first but can easily be understood by looking at the plot in FIG. 3 of the frequency spectrum of the digital signal. In the HSDPA system, the symbol rate is equal to 3.84 MHz. Hence, the symbol rate receiver will be able to process the signal in the frequency range −1.92 MHz to 1.92 MHz. It can be seen from FIG. 3 that most of the useful signal is confined in this range (the attenuation at 2 MHz is already equal to 10 dB). Hence, it is possible for a symbol-rate receiver to provide good performance provided that the ideal timing point can be identified in the receiver.

SUMMARY OF THE INVENTION

According to one aspect, the invention provides a method of analysing a sampled signal that is supplied for decimation, wherein the decimation process produces a decimated version of the signal and aliases of the signal and wherein the method comprises determining an adjustment, if any is required, to the sampling instant of the signal prior to decimation that will cause the frequency responses of the decimated version of the signal and of the main alias to combine constructively at a given frequency.

Constructive interaction between the frequency responses of the decimated version of the signal and of the main alias lead to good performance in the case where the sampled signal is an HSDPA data signal that is to be decimated to a sampling frequency equal to the symbol rate of the data signal such that the data signal can then be demodulated using an LMMSE architecture operating at the symbol rate.

The adjustment determined by the aforementioned aspect of the invention may be used to adjust the sampling instant of the signal prior to its decimation. For example, it is within the capabilities of the skilled person to design a filter that could shift the sampling instant of the sampled signal. The adjustment to the sampling instant that is determined by the aforementioned aspect of the invention may be filtered or refined before being used to make an actual adjustment to the sampling instant. For example, values of the adjustment may be accumulated over time with the accumulated value of the adjustment being used as a current value of the adjustment that is then applied to the sampling instant. Various schemes can be used for weighting the values that are accumulated in order to improve performance.

The frequency at which constructive interaction between the frequency responses of the sampled signal and its main alias is sought may be chosen arbitrarily. However, where the invention is being used to enhance the performance of a demodulator operating on a communications signal that has been decimated to its symbol rate, better performance of the demodulator will be achieved by setting this arbitrary frequency to one half, or thereabouts, of the sample frequency of the data signal following decimation.

In certain embodiments, the sampled signal is a communications signal conveying a stream of symbols. For example, the sampled signal may contain an HSDPA HS-DSCH data channel.

According to the foregoing aspect of the invention, a sampling instant adjustment is determined that will cause the frequency responses of the decimated version of the signal and of its main alias to combine constructively. The frequency response of the decimated version of the signal may be determined by, for example, calculating the discrete fourier transform of the impulse response of the channel through which the signal is received. The frequency response of the main alias may then be taken as a version of the frequency response of the decimated signal that has been offset by an amount equal to the sampling frequency of the signal prior to decimation.

The invention has been described primarily in terms of a method. However, the invention also extends to software arranged to perform such methods and also to apparatus configured to perform such methods.

BRIEF DESCRIPTION OF THE DRAWINGS

By way of example only, certain embodiments of the invention will now be described in more detail, with reference to the accompanying Figures, in which.

DETAILED DESCRIPTION

Figure 1:
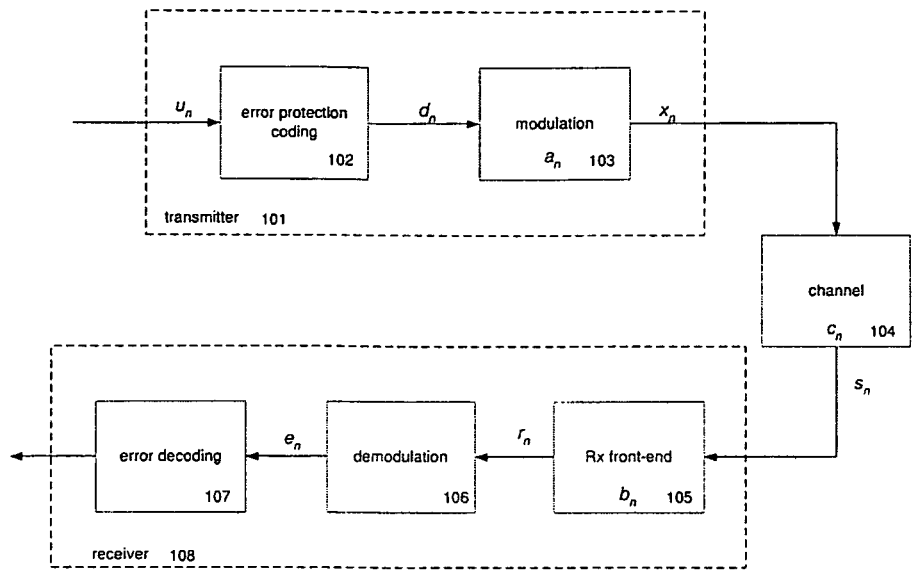
FIG. 1 presents a typical receiver operating in a digital communication system.
Figure 2:
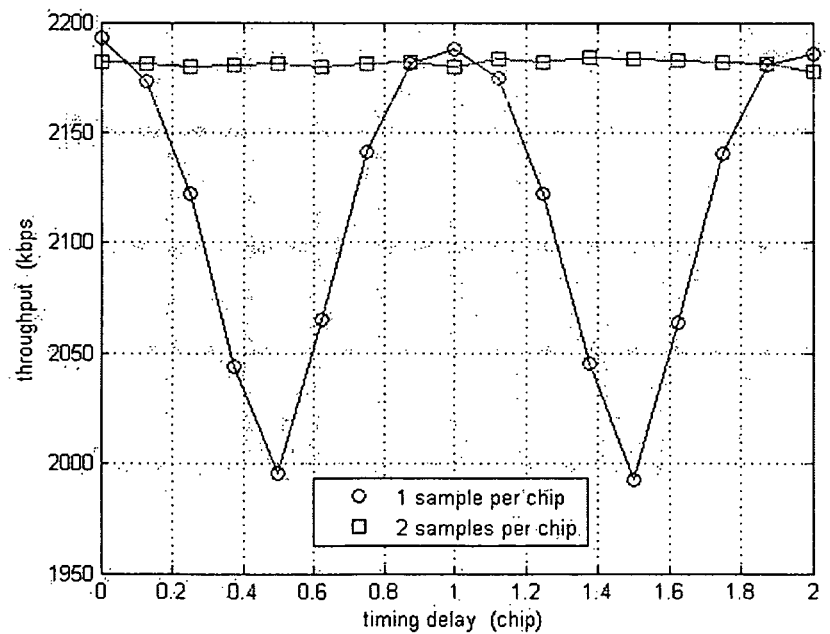
FIG. 2 illustrates the sensitivity of the receiver to the timing point for both symbol-rate and over-sampled architectures.
Figure 3:
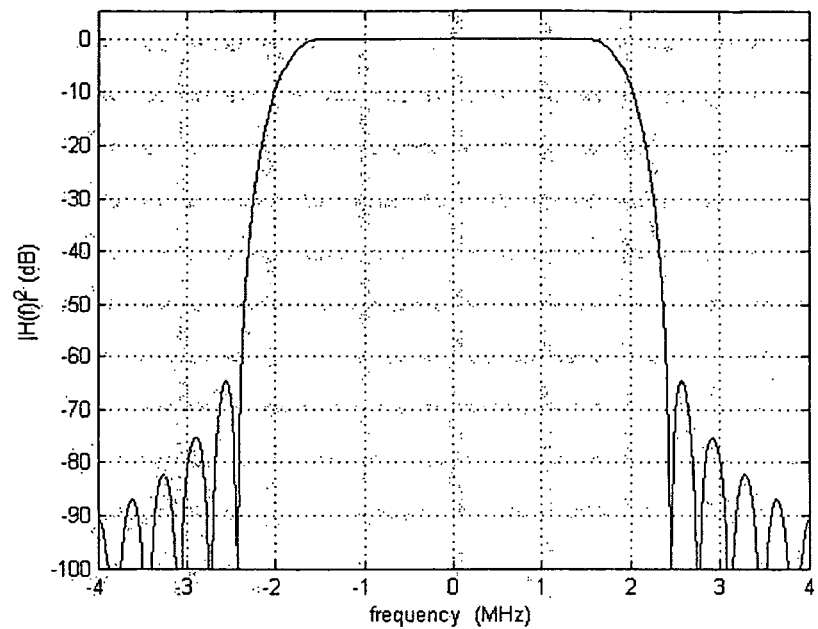
FIG. 3 presents the frequency spectrum of the HSDPA signal.
Figure 4:
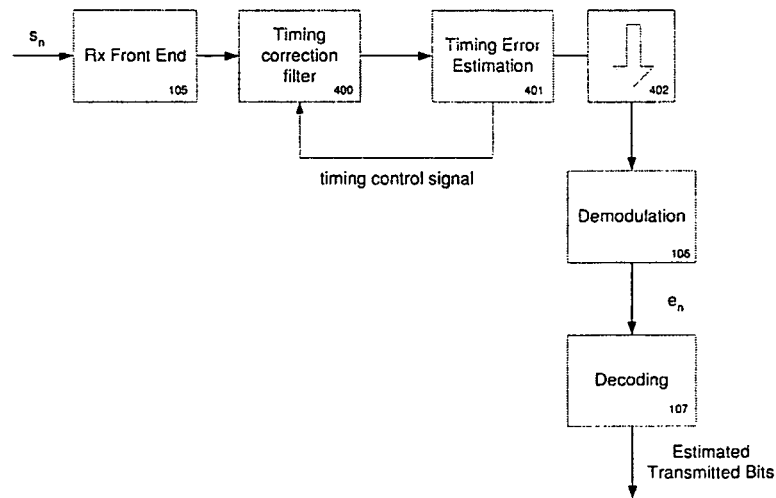
FIG. 4 presents one possible application of the proposed invention.
Figure 5:
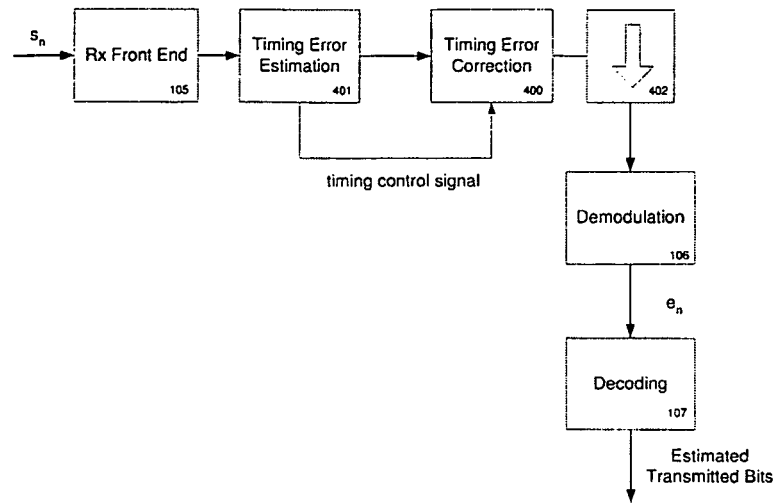
FIG. 5 presents an alternative application of the proposed invention.

FIG. 4 and FIG. 5 present two possible implementations of the proposed architecture. In FIG. 4, the Rx front end module (105) is followed by a timing correction filter (400). It is assumed in both FIG. 4 and FIG. 5 that the signal produced by the Rx front end module (105) is over-sampled (for example for an HSDPA system the signal could be generated with 2 samples per chip). The timing correction filter applies a known delay to the received signal without modifying any other characteristic (i.e. the filter is an all-pass filter with a linear phase). Different implementations of the timing correction filter (400) are possible and their description is outside the scope of the present document. The signal controlling the delay introduced by the timing correction filter (400) is derived from the delayed signal in unit (401). The delayed signal is then decimated in unit (402) such that the signal is then down-sampled to the symbol rate. The demodulation unit (106) can therefore operate at the symbol rate. Finally error correction is performed in 107 in order to generate estimates of the transmitted signal.

In FIG. 4, the timing control signal derived by the timing error estimation unit 401 is fed-back to the timing correction filter (400). FIG. 5 presents the equivalent feed-forward architecture. In the architecture presented in FIG. 5, the timing error estimation unit (401) directly operates on the signal produced by the Rx front-end (105) before any delay is applied. The timing control signal derived in 401 is then used to drive the timing correction 400. The output of the timing correction filter (400) is then passed to the down-sampling unit (402). The symbol-rate samples from the down-sampling unit (402) are then processed by the demodulation (106) and error correction (107) units to generate estimates of the transmitted information.

Before describing the embodiments of FIGS. 4 and 5 in greater detail, particularly in relation to the nature of the unit 401, same general remarks on the properties, characteristics and benefits of these embodiments will now be offered.

The embodiments described in this document provide an architecture for the estimation and correction of timing errors in a digital signal, in which an ideal timing point is derived from an estimate of the propagation channel and in which a mechanism for correcting deviation from this optimal point is presented.

The embodiments described in this document present timing estimation apparatus that derives a timing control signal to be used in digital communication systems. The timing control signal can be used to drive a timing correction mechanism (such as a fractional delay filter for example) in order to achieve ideal timing in a digital communication receiver. The timing estimation and timing correction units can be combined using either a feed-forward architecture (FIG. 5) or a feedback architecture (FIG. 4).

The signal processed by the timing estimation and timing correction is over-sampled (the over-sampling ratio only needs to be strictly larger than 1). The timing estimation and timing correction units operate in a manner such that the ideal timing in the output signal is aligned with the symbol period. Hence, the use of the proposed timing estimation mechanism with a timing correction filter allows the demodulation unit to operate on a symbol-rate signal while achieving the same performance as a more complex over-sampled implementation.

The timing control signal is derived in the timing estimation unit from the knowledge of the propagation channel (either known a-priori or estimated). The timing control signal is derived using the frequency response of the propagation channel. The timing estimation apparatus estimates the ideal timing instant such that the aliasing components in the frequency response of the decimated channel add constructively with the actual frequency response.

Compared to prior-art solutions where a timing control signal is derived directly from the received signal, the proposed embodiments present a number of advantages. First, by operating on the propagation channel rather than on the received signal, the number of samples to process in order to derive the timing control signal is significantly reduced. The number of samples used to define the propagation channel depends on the actual propagation environment but is usually significantly lower than the number of received samples that are required to derive a timing control signal. Hence the proposed embodiments present advantages in terms of implementation complexity. Moreover, and perhaps more significantly, the accuracy of the timing control signal derived from the propagation channel is better than that of control signals estimated from the received signals. This is true even in the case where the propagation channel is estimated from the received signal.

When the channel is not known a-priori, a pilot signal or training sequence is typically embedded in the transmitted signal such that the receiver can make use of this known transmitted sequence to estimate the propagation channel. This pilot signal is often received with a better quality than the rest of the signal (the training sequence can for example be transmitted with a higher power than the rest of the signal). In the 3GPP standard, the Common Pilot Channel (CPICH) can be used for channel estimation (3*GPP TS* 25.211; *Technical Specification Group Radio Access Network; Physical channels and mapping of transport channels onto physical channels (FDD)*). An estimate of the propagation channel is derived by correlating the received signal with the known CPICH channel. The correlation with the known CPICH signal improves the Signal to Noise Ratio (SNR) in the generated channel estimates by a factor equal to the spreading factor of the CPICH channel. Using the format defined in the 3GPP standard, this gain in the channel estimation SNR is close to 27.1 dB.

It should be noted that the application of the described timing control approach is not limited to communication systems where a pilot signal is embedded in the transmitted signal. In the absence of a pilot signal, it is possible to use blind estimation techniques in order to derive an estimate of the propagation channel.

In order to further improve the quality of the timing control signal, a number of filtering stages can be performed. First, a low-pass filter is applied to the complex symbols corresponding to the frequency estimates of the propagation channel. This first low-pass filter is applied prior to the timing error estimation. Applying the low-pass filter to the complex symbols rather than to the timing error signal avoids any delay due to the group delay characteristics of the filter. Further filtering of the timing error signal can also be performed. It is possible to increase the gain from such filtering stage operating on timing error estimates by removing/de-emphasising the contributions from noisy estimates. The present document describes such a mechanism based on the power of the complex symbols corresponding to the frequency estimates of the propagation channel.

In one preferred embodiment of the proposed invention, the frequency response of the propagation channel is first calculated for a sampling rate equal to twice the chip rate. The timing position is then derived such that the alias combination of the original frequency response with the images is constructive when decimating down to one sample per chip. The aliasing from the decimation is controlled at both edges of the frequency range available at one sample per chip. In this specific embodiment, the frequency response estimates required for the derivation of the desired timing position can be generated without the need for any multiplication operation.

The proposed invention can be applied to any digital communications system where the propagation channel is either known or can be estimated, using for example a pilot or training signal. The application of the proposed invention is not limited to any specific multiple access scheme nor to any specific transmission format. It should also be noted that the proposed architecture covers both single antenna and multiple antenna links scenarios (at both the transmission and reception side).

The timing estimation apparatus can be realised in hardware, software on a processor, or a combination thereof.

In order to describe the proposed embodiments in greater detail, it is first required to present the model of the transmission link that will be used.

The received signal can be expressed as $$r(k) = \sum_{l=0}^{L} x(l)c(k-l) + \sum_{l=0}^{L} x(l)s(k-l) + \zeta(k)$$

where $\{x(k)\}_{k \in \{0, \ldots, L\}}$ represent the different propagation channel taps. $\zeta(k)$ models the combination of thermal noise and interference from adjacent cells. $\zeta(k)$ is assumed to be Additive White Gaussian Noise (AWGN) with variance equal to $\sigma^2$. The samples $c(k)$ denote the transmitted pilot sequence and $s(k)$ is used to represent the other signals from the different users in the serving cell.

It is assumed in the rest of the document, without any loss of generality, that $$\alpha = \frac{1}{N} \sum_{k=0}^{N-1} |c(k)|^2.$$

The channel impulse response (CIR) is derived by correlating the received signal with the pilot sequence $$\hat{x}(l) = \frac{1}{N} \sum_{k=0}^{N-1} r(k) c^*(k-l)$$

where N is the spreading factor of the W-CDMA pilot signal.

This correlation can be shown to be made of 4 terms $$\hat{x}(l) = \alpha \times x(l) + \frac{1}{N} \sum_{\substack{m=0 \\ m \neq l}}^{L} x(m) \sum_{k=0}^{N-1} c(k-m) c^*(k-l) +$$

$$\frac{1}{N} \sum_{\substack{m=0 \\ m \neq l}}^{L} x(m) \sum_{k=0}^{N-1} s(k-m) c^*(k-l) + \frac{1}{N} \sum_{k=0}^{N-1} \zeta(k) \times c^*(k-l)$$

The first term in the above equation corresponds to the actual channel tap value scaled by the power of the pilot signal. The additional three terms represent the noise generated in the estimation process.

The above equation for the estimation of the channel impulse response assumes that the signal has been received at the sample rate. The described approach can however easily be extended to the over-sampling case. In an over-sampled system, the known CPICH signal, which is defined at symbol rate only, is correlated against the different phases within one chip of the received signal. The results of the correlations against the different phases of the received signal can then be collated in order to generate a channel impulse response at a sample rate higher than the symbol rate. It should be stressed that the use of the correlation of the received signal against the CPICH signal is only one possible method to generate an estimate of the channel impulse response. The application of the proposed invention is applicable to any channel impulse response estimation technique. It would be possible to use other techniques, such as linear Least-Square fitting (*Digital Communications*, John G. Proakis, $2^{nd}$ edition, McGraw-Hill International), in order to derive the channel estimates. It is also possible to use techniques that can operate in the absence of a pilot signal and/or training sequence. Blind channel estimation approaches can for example be used (*Blind Channel Estimation Using First and Second Derivatives of the Characteristics Function*, A. Yeredor, *IEEE Signal Processing Letters*, vol. 9, no. 3, March 2002).

The spectrum of the propagation channel as seen by the receiver can be expressed as follows $$H_T(f) = \sum_n X\left(f - \frac{n}{T_s}\right) e^{j2\pi(f-n/T_s)\tau_0}$$
$$= e^{j2\pi f \tau_0} \sum_n X\left(f - \frac{n}{T_s}\right) e^{j2\pi \frac{n}{T_s} \tau_0}$$

where $T_s$ is the sampling period at the receiver. In the case of a symbol-rate implementation of the receiver, $T_s$ is equal to the inverse of the symbol rate $f_c$. When over-sampling is used, $T_s$ is equal to $\phi/f_c$ where $\phi$ is strictly lower than 1. X(f) denotes the true frequency response of the propagation channel. $\tau_0$ is the delay introduced at the receiver by the timing correction filter (400).

Figure 6:
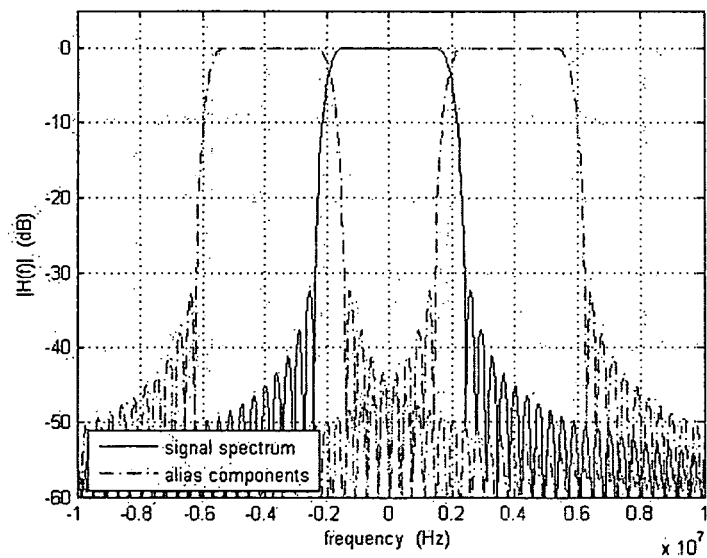
FIG. 6 presents the frequency spectrum of the 3GPP signal with aliasing components at 1 sample per chip.
Figure 7:
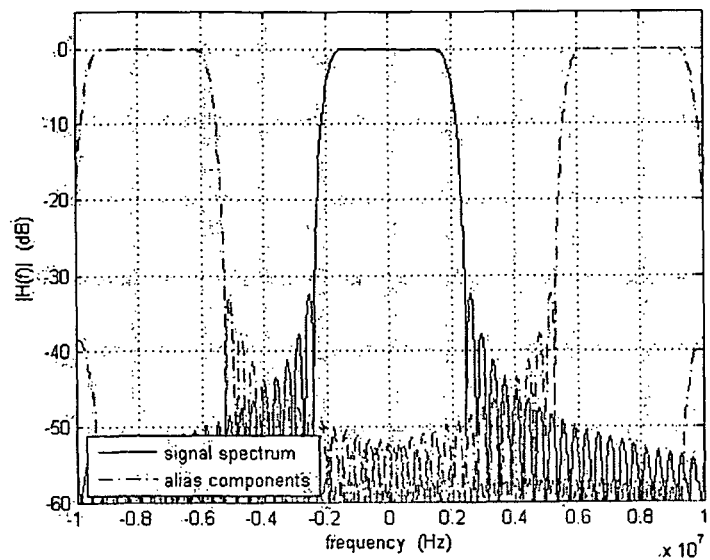
FIG. 7 presents the frequency spectrum of the 3GPP signal with aliasing components at 2 samples per chip

It can be seen from the above equation that the spectrum of the propagation channel as seen by the receiver does include alias terms. The alias terms in the equation correspond to the terms where n is different from 0. The contribution of these alias terms to the spectrum of the decimated channel impulse response depends on the propagation channel response, the sampling phase $\tau_0$ and the sample period $T_s$. FIG. 6 and FIG. 7 present the spectrum of the 3GPP signal with the associated image components for both cases of 1 sample per chip and 2 samples per chip, respectively. It can be seen by comparing these two figures that the overlap region between the actual spectrum of the signal and the aliasing components is significantly larger when the demodulation unit operates at 1 sample per chip compared to the 2 samples per chip scenario. This means that aliasing is going to be more significant when the signal is sampled at the symbol rate.

Figure 8:
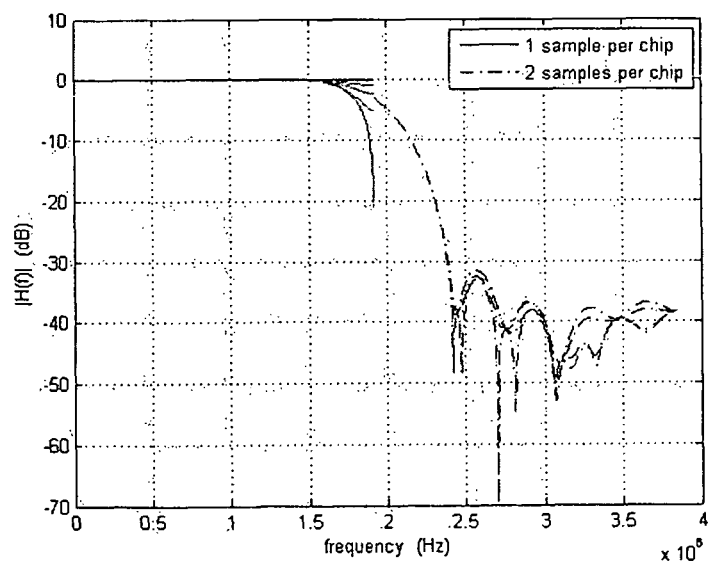
FIG. 8 presents the aliased spectrum at 1 sample per chip and 2 samples per chip for different decimation phases.

FIG. 8 presents the frequency response of the decimated propagation channel for both cases of 1 sample per chip and 2 samples per chip sampling rate. The frequency response has been calculated for different sampling phases. It can be seen that in the case of a signal processed at 2 samples per chip, the frequency response is essentially the same for all the different decimation phases. On the other hand, when the signal operates at one sample per chip, the decimated frequency response significantly varies with the sampling position. This is due to the aliasing caused by the decimation process.

As indicated in the equation presenting the frequency response of the decimated propagation channel, the combination of the actual response with the aliasing components depends on the sampling time $\tau_0$. The aim of the proposed timing estimation apparatus is to derive a timing control signal such that, for a given frequency point $f_a$ the actual response and the main image component (i.e., the component where n=1 in the preceding equation) combine constructively during the aliasing caused by the decimation. This condition can be expressed as follows (the equation below assumes that $f_a \geq 0$ but the approach can easily be extended to cover the case where $f_a < 0$)

$$Im\{X^*(f_a) \times X(f_a - f_s) \times e^{-2j\pi\tau_0 f_s}\} = 0$$

The product $X^*(f_a) \times X(f_a - f_s)$ can be expressed in the following general form $$X^*(f_a) \times X(f_a - f_s) = \Xi(f_a) \times e^{j\beta(f_a)}$$

The condition for constructive combination of the main alias component can therefore be expressed as $$\beta(f_a) - 2\pi\tau_0 f_s = 0$$

Hence the ideal timing position can be derived using the following equation $$\frac{\tau_0}{T_s} = \frac{\beta(f_a)}{2\pi}$$

The above equation shows that the ideal timing position (ideal in the sense of generating constructive aliasing for a given frequency point), can be derived from the knowledge of the frequency response of the propagation channel.

The frequency $f_a$ is an arbitrary frequency. In practice, good performance is achieved when $f_a = f_s/2$. This condition defines the crossing point between the "envelopes" of the frequency responses of the main signal and the first (n=1) alias. Reasonable performance is achieved at frequencies around $f_s/2$ although performance is likely to diminish as $f_a$ moves further away from $f_s/2$. It should be noted that it would be possible to adaptively vary the value of $f_a$ based, for example, on the characteristics of the channel impulse response.

Figure 9:
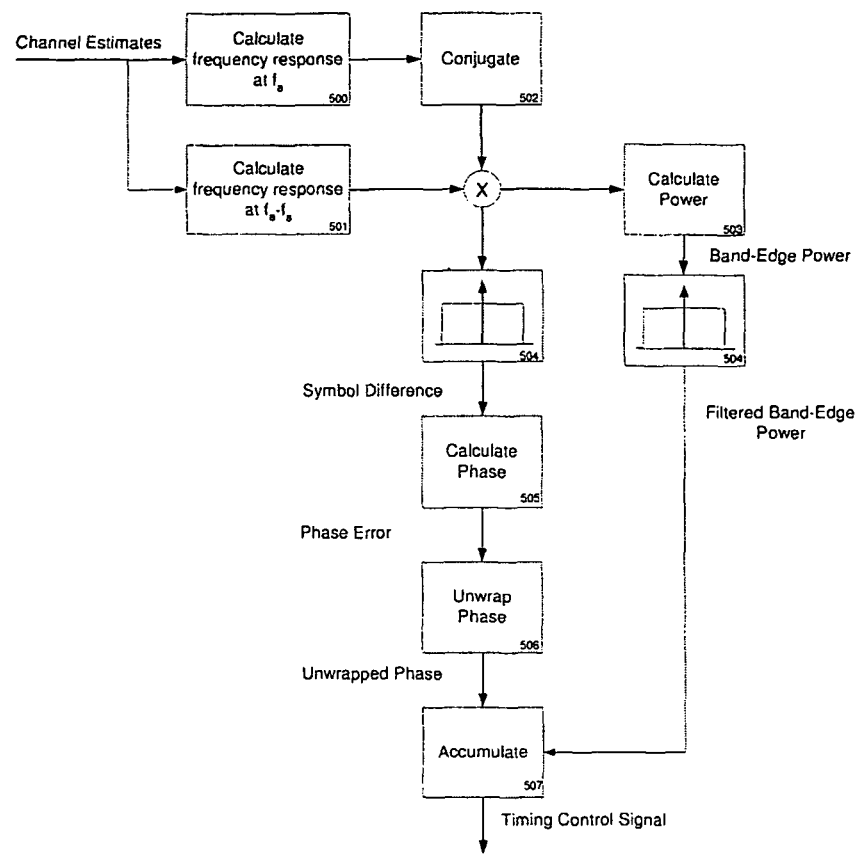
FIG. 9 presents one preferred embodiment for the timing estimation apparatus.

FIG. 9 presents one specific embodiment of the proposed timing estimation apparatus. The propagation channel taps, either estimated or known a-priori, are passed to units 500 and 501 in order to generate the frequency response values $X(f_a)$ and $X(f_a - f_s)$. A number of different techniques can be used for the estimation of the frequency response values $X(f_a)$ and $X(f_a - f_s)$. The application of the approach described in this document is not limited to any specific frequency estimation technique. It would, for example, be possible to calculate the frequency response values by applying a DFT to the propagation channel taps. The estimated frequency response $X(f_a)$ is then conjugated in unit 502 in order to obtain $X^*(f_a)$. The complex product $X^*(f_a) \times X(f_a - f_s)$ can then be calculated from these two frequency response values. The complex product $X^*(f_a) \times X(f_a - f_s)$ is passed through a low-pass filter 504 in order to try and reduce the estimation noise. The phase $\beta(f_a)$ of the filtered complex product is then estimated in unit 505. The ideal timing position can then be directly estimated from this phase value.

It should be noted that it would have been possible to estimate the phase $\beta(f_a)$ from the unfiltered complex product $X^*(f_a) \times X(f_a - f_s)$ and then to apply a low-pass filter on the phase value (i.e. swap the order of the units 504 and 505). However, doing so would introduce a delay in the generation of the filtered phase value equal to the group delay of the low-pass filter. This is not the case when the filter is applied to the complex product $X^*(f_a) \times X(f_a-f_s)$ since the ratio between the imaginary and real parts is largely valid even before the filter has been fully initialised.

The estimation of the phase $\beta(f_a)$ from the filtered version of the complex product $X^*(f_a) \times X(f_a-f_s)$ can be performed using a number of different techniques. It is possible, for example, to estimate the phase $\beta(f_a)$ from the inverse tangent of the ratio between the imaginary and real parts of the complex product. However, it should be stressed that the application of the proposed timing estimation approach is not limited to any specific implementation of the phase estimation unit 505.

However, because the timing estimates generated by unit 505 have a range limited to one sample, the values may wrap between consecutive estimates. Hence, it is important to unwrap the phase/timing estimates before they are processed further. This step is performed by unit 506 and provides an unwrapped timing estimate $\tau(f_a)$. The unwrapped phase errors produced by block 508 are then used by block 508 to calculate timing errors. Each unwrapped phase error $\beta(f_a)$ is used to calculate a corresponding timing error according to the equation.

$$\frac{\tau_0}{T_s} = \frac{\tau(f_a)}{2\pi}$$

The timing errors $\tau(f_a)$ are then supplied to unit 507, where they are accumulated.

The accumulation unit 507 generates a timing control signal that can be used to control the timing correction filter (400). This timing control signal is the current value of the accumulation of the timing errors calculated by unit 508 and is the current value of the change that needs to be applied to the sample positions by filter 400.

The accumulation of the unwrapped phase values in unit 507 will provide some low-pass filtering that improves the accuracy of the timing control signal. The accumulation can for example be implemented as a first order loop where it is possible to optimise the bandwidth to get the most accurate results for a given noise environment. It is possible to increase the noise reduction capability of the accumulation unit 507 by according different weights to input timing estimate values depending on their relative accuracy. FIG. 9 presents one way to achieve this. The power $P(f_a)$ of the complex product $X^*(f_a) \times X(f_a-f_s)$ is first calculated in unit 503 and then passed to the low-pass filter 504. This power value can then be used as a weight in the accumulation of the timing estimates $\tau(f_a)$. Different weighted combination techniques can be implemented in unit 507 to make use of this reliability information on the timing estimates $\tau(f_a)$.

For example, it is possible to perform the accumulation as follows $$\tau(n+1) = \tau(n) + \chi(\tau(f_a) \times P(f_a))$$

where $\chi$ is a parameter controlling the loop bandwidth of the accumulation. $\tau(n)$ represents the timing control signal before the new estimate $\tau(f_a)$ is processed and $\tau(n+1)$ represents the timing control signal after $\tau(f_a)$ has been accumulated.

In a second embodiment of unit 507, the accumulation can be performed as follows $$\tau(n+1) = \begin{cases} \tau(n) + (\chi \times \tau(f_a)) & \text{if } P(f_a) \geq P \\ \tau(n) + \left(\chi \times \tau(f_a) \times \frac{P(f_a)}{P}\right) & \text{otherwise} \end{cases}$$

where P is a threshold which value can be set according, for example, to the noise conditions of the communication system.

A specific embodiment of the proposed timing estimation unit will now be described. This specific embodiment is of interest first because the implementation complexity can be reduced. This special case also possesses specific characteristics in terms of performance.

For this specific embodiment, it is assumed that the sampling rate at the input to the timing error estimation unit 401 is equal to twice the chip rate and that the sampling rate $f_s$ at the output of the decimation unit 402 is equal to the chip rate $f_c$. The frequency $f_a$ for which the aliasing is aimed to be constructive is equal to $f_c/2$.

In this case, the timing position $\tau(f_a)$ is derived such that $$Im\{X^*(f_c/2) \times X(-f_c/2) \times e^{-2j\pi\tau(f_a)/f_s}\} = 0$$

It is interesting to note from the above equation that in this specific case, when aliasing happens constructively for $f_a=f_c/2$, it is also constructive for $f_a=-f_c/2$. Hence, constructive aliasing will occur for both edges of the frequency spectrum defined at one sample per chip.

In this specific embodiment, the generation of the frequency responses $X(f_c/2)$ and $X(-f_c/2)$ can be generated in a very low complexity manner. The frequency response values can be generated using the following equations $$\begin{cases} X(f_c/2) = \sum_{n=0}^{L} x(n) \times e^{-j\frac{\pi}{2}n} \\ X(-f_c/2) = \sum_{n=0}^{L} x(n) \times e^{+j\frac{\pi}{2}n} \end{cases}$$

It will be obvious to anyone skilled in the art that the above equations can easily be implemented without the need to generate a phasor nor to perform any multiplication. Hence, the implementation complexity of the frequency response estimation is very low for this specific embodiment of the proposed invention.

In the frequency domain, the width of the response estimation bin generated by the above equations depends on the number of samples L+1 over which the channel taps are combined. The lower the accumulation size, the wider the range covered by the frequency estimation process. In the presence of frequency selective fading, it is possible for the frequency components for $+f_c/2$ and $-f_c/2$ to be heavily attenuated. In such a case, it may be beneficial to reduce the accumulation size in order to get more energy in the frequency estimates. Hence, the performance of the proposed timing estimation mechanism can be improved by adapting the accumulation length to the fading conditions. For example, it is possible to set the accumulation length such that the minimum power for the frequency responses $+f_c/2$ and $-f_c/2$ is above a given threshold.

The invention claimed is:

1. A method of analyzing a sampled signal that is supplied to a decimation process that produces a decimated signal, the method comprising:

determining an adjustment to a sampling phase employed to obtain the sampled signal prior to the decimation process that will cause the frequency responses of the sampled signal and a main alias of the sampled signal to combine constructively in at least one given place in the frequency domain after decimation, wherein determining the adjustment comprises:

calculating a product of the frequency responses after complex conjugating at least one of the frequency responses, and filtering the product; calculating a phase of the filtered product; unwrapping the calculated phase; and deducing the adjustment from the unwrapped phase of the product.

2. A method according to claim 1, wherein the adjustment is accumulated.

3. A method according to claim 1, wherein the sampled signal is a High-Speed Downlink Packet Access (HSDPA) data signal that is decimated by said decimation process to its symbol rate.

4. A method according to claim 3, wherein the HSDPA data signal has a frequency that is substantially half the symbol rate of the signal.

5. A method according claim 1, wherein the frequency responses of the decimated signal and its main alias are calculated by a Discrete Fourier transform (DFT) process and an accumulation length in the DFT process is adjustable.

* * * * *